United States Patent [19]

Dubowik

[11] Patent Number: 4,870,725
[45] Date of Patent: Oct. 3, 1989

[54] POP-THROUGH TOUCH FASTNER

[75] Inventor: John M. Dubowik, Nashua, N.H.

[73] Assignee: Velcro Industries B.V., Amsterdam, Netherlands

[21] Appl. No.: 147,013

[22] Filed: Jan. 15, 1988

Related U.S. Application Data

[63] Continuation of Ser. No. 2,032, Jan. 12, 1987, abandoned.

[51] Int. Cl.$^4$ ............................................. A44B 18/00
[52] U.S. Cl. ................................... 24/442; 248/205.2; 248/489
[58] Field of Search ................. 428/100; 52/DIG. 13; 24/304, 662, 306, 442, DIG. 11; 2/DIG. 6; 248/205.1, 205.2, 205.3, 467, 489

[56] References Cited

U.S. PATENT DOCUMENTS

| | | | |
|---|---|---|---|
| 2,061,372 | 11/1936 | Wallin | 24/DIG. 11 |
| 2,071,981 | 2/1937 | Landsiedel | 24/DIG. 11 |
| 3,176,364 | 4/1965 | Dritz | 24/304 |
| 3,261,069 | 7/1966 | Mathison | 24/306 X |
| 3,376,618 | 4/1968 | Schwarzkopf | 24/662 X |
| 3,423,764 | 1/1969 | Cassling | 24/DIG. 11 |
| 3,455,589 | 7/1969 | Valiulis | 24/442 X |
| 3,471,903 | 10/1969 | Northrup et al. | 24/306 |
| 3,574,019 | 4/1971 | Girard | 428/100 X |
| 3,777,435 | 12/1973 | Penna | 428/100 X |
| 3,792,505 | 2/1974 | Saltzstein | 24/306 X |

FOREIGN PATENT DOCUMENTS 2144987 3/1985 United Kingdom ............... 248/489

Primary Examiner—James R. Brittain
Attorney, Agent, or Firm—Hayes, Soloway, Hennessey & Hage

[57] ABSTRACT

A touch fastner component for flush-mounting a first planar surface to a second planar surface and comprising a piece of resiliently flexible material having one portion of touch fastener material attached to a surface thereof adjacent a center portion thereof and means for holding the piece of material in a foreshortened bi-stable state disposed over a hole in one of the surfaces and for allowing the piece of material to move between a first stable position arched over the hole and a second stable position depressed into the hole with the one portion of touch fastener material slightly below the one of the surface whereby it can grip the mating portion of touch fastener material disposed on the other of the surfaces to maintain the first and second planar surfaces flush with one another under a biasing force. In one embodiment, the flexible material and the holding means are of unitary construction, the flexible material and the holding means are circular in shape, and the flexible material comprises a centrally located dome. In another embodiment, the flexible material comprises a strip of material and the holding means comprises a cup-shaped member adapted to fit into the hole and including opposed recesses adjacent a top edge for receiving the ends of the strip.

12 Claims, 4 Drawing Sheets

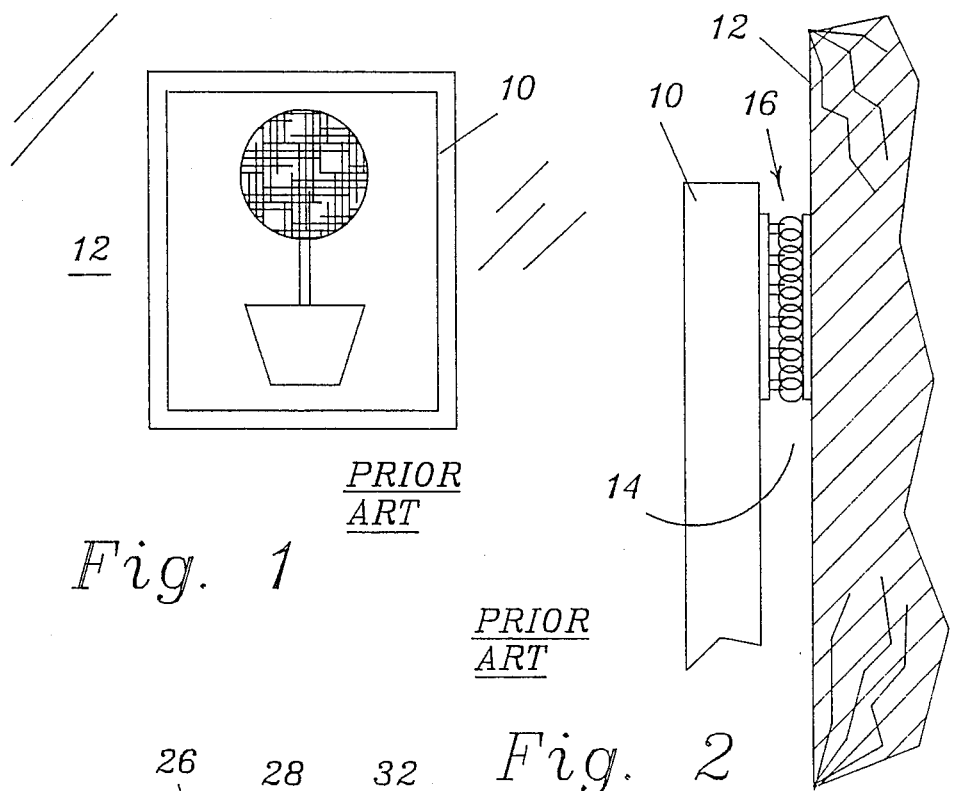
Fig. 1 PRIOR ART
Fig. 2 PRIOR ART
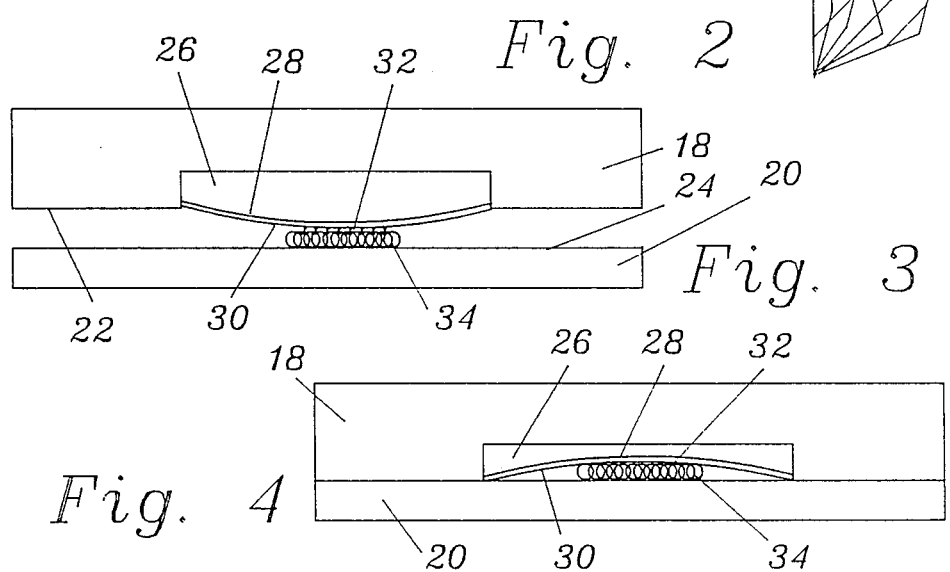
Fig. 3
Fig. 4

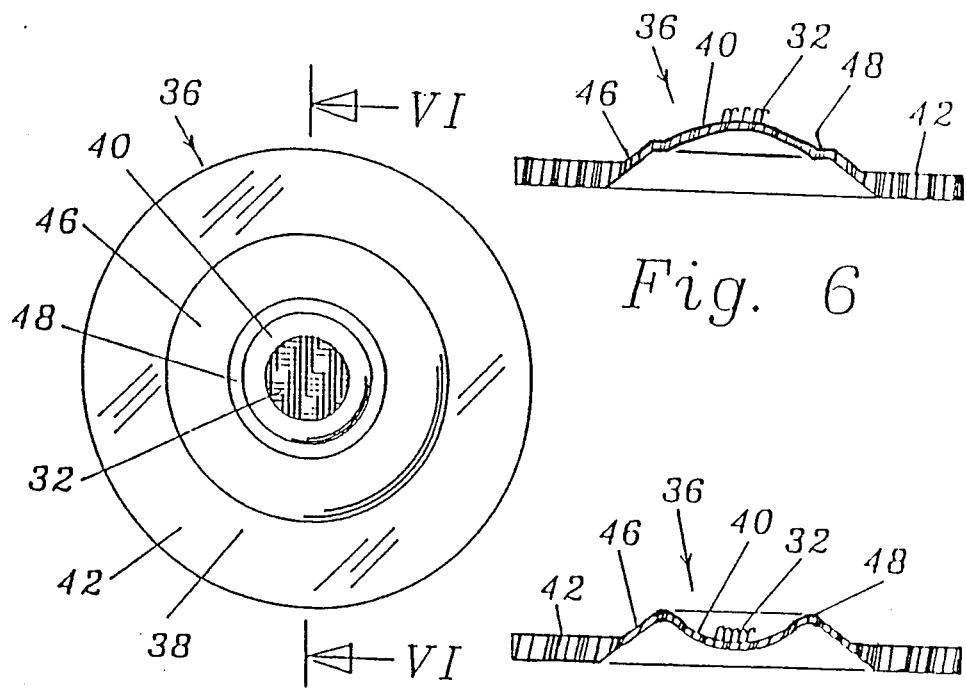
Fig. 6
Fig. 5  Fig. 7
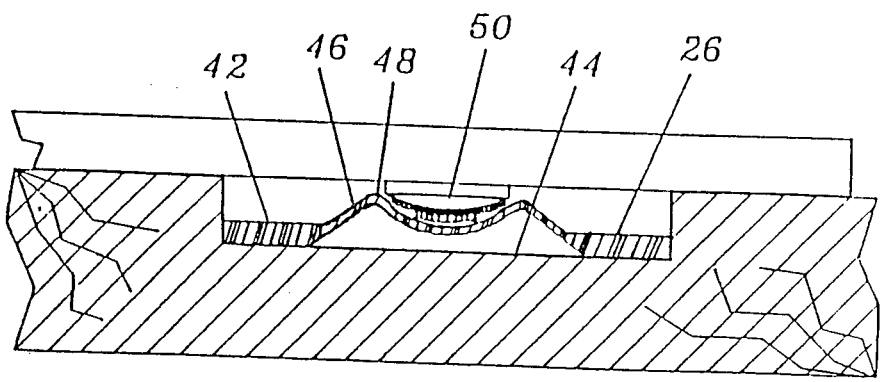
Fig. 8

POP-THROUGH TOUCH FASTENER

This is a continuation of co-pending application Ser. No. 002,032 filed on Jan. 12, 1987, abandoned.

BACKGROUND OF THE INVENTION

The present invention relates to touch fastener systems and, more particularly to a touch fastener component for flush-mounting a first planar surface to a second planar surface and comprising, a piece of planar, resiliently flexible material having one portion of touch fastener material attached to a surface thereof adjacent a center portion thereof and means for holding the material in a foreshortened bi-stable state disposed over a hole in one of the surfaces and for allowing the material to move between a first stable position arched over the hole and a second stable position depressed into the hole with the one portion of touch fastener material slightly below the one of the surfaces whereby it can grip the mating portion of touch fastener material disposed on the other of the surfaces to maintain the first and second planar surfaces flush with one another.

The present invention has to do with touch fastener systems. A touch fastener, as the term is used herein, comprises a first planar backing material having a surface carrying hooks, mushrooms, balls on stems, pigtails, or the like, capable of engaging loops, hooks, mushrooms, balls on stems, pigtails, or the like, carried by a second planar backing material to releasably fasten components together. By way of example only, hook and loop type touch fastener material such as that sold by the assignee of this application under the trademark VELCRO are shown and described in the drawings and descriptions contained hereinafter.

Touch fastener materials have enjoyed great popularity and new uses therefor are constantly being realized. In use, one portion is attached to one surface to be joined and the other portion is attached to another surface to be joined. To join the two surfaces, the two touch fastener portions are merely pressed together. To separate the two surfaces, the two touch fastener portions are pulled apart. The joining force is quite substantial, particularly in the "shear" direction while even major misalignment is accommodated.

FIG. 1 illustrates one common use for touch fastener materials, i.e. attaching a picture 10, or the like, to a surface such as a wall 12. As shown in the side view of FIG. 2, the prior art approach results in a gap 14 between the back surface of the picture 10 and the wall 12 caused by the thickness of the adhesive backing and active portions of the touch fastener materials generally indicated as 16. In many instances, the small gap 14 is quite acceptable. In others, both the gap and the ability of viewing the touch fastener materials 16 therethrough are aesthetically unpleasing. One principal example is the use of touch fastener materials to attach a speaker grill to the speaker enclosure. Where the design does not include a surrounding outer framework containing the grill therein so as to hide any gap, absolute flush mounting is required of the mounting system employed.

Wherefore, it is the object of the present invention to provide a mounting system for use with touch fastener materials which will provide for mounting of two surfaces flush together.

SUMMARY

The foregoing object has been achieved by the touch fastener component of the present invention for flush-mounting a first planar surface to a second planar surface comprising a piece of resiliently flexible material having one portion of touch fastener material attached to a surface thereof adjacent a center portion thereof and means for holding the material in a bi-stable state disposed over an opening in one of the surfaces. The material is adapted to move between a first stable position arched over the opening and a second stable position depressed into the opening with the one portion of touch fastener material slightly below the one of the surfaces whereby it can grip the mating portion of touch fastener material disposed on the other of the surfaces to maintain the first and second surfaces flush with one another.

In one embodiment, the flexible material and the holding means are of unitary construction, the flexible material and the holding means are circular in shape, and the resiliently flexible material comprises a centrally located dome.

In another embodiment, the resiliently flexible material comprises a strip of material and the holding means comprises a cup-shaped member adapted to fit into the opening and including opposed recesses adjacent a top edge for receiving the ends of the strip.

DESCRIPTION OF THE DRAWINGS

FIG. 1 is a drawing showing the environment wherein the present invention is particularly useful.

FIG. 2 is a side view of the upper portion of FIG. 1 showing the prior art manner of using touch fastener materials to attach a picture, or the like, to a surface.

FIG. 3 is a simplified drawing showing the present invention in one of its two bi-stable positions.

FIG. 4 is a simplified drawing showing the present invention in the other of its two bi-stable positions.

FIG. 5 is a plan view of the present invention in one of its embodiments.

FIG. 6 is a cutaway view of FIG. 5 in the plane VI—VI showing the present invention in one of its two bi-stable positions as corresponding to the position of FIG. 3.

FIG. 7 is a cutaway view corresponding to the view of FIG. 6 showing the present invention in the other of its two bi-stable positions as corresponding to the position of FIG. 4.

FIG. 8 is a cutaway view showing the present invention employed to flush-mount two surfaces together.

DESCRIPTION OF THE VARIOUS EMBODIMENTS

Figure 9:
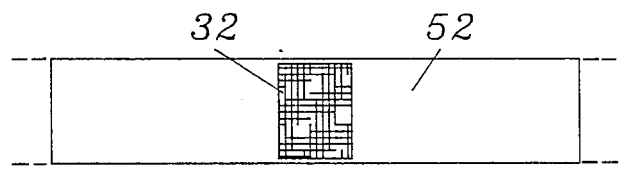
FIG. 9 is a plan view of the present invention in its simplest embodiment when configured as a rectangular strip.

The principle of the present invention is shown in simplified form in FIGS. 3 and 4. It is intended to join first member 18 and second member 20 together with their respective facing surfaces 22, 24 flush together. A hole (or opening) 26 is provided in one of the surfaces. In the example shown, the hole 26 is in surface 22. In actual use, the choice of the surface into which the hole is made or formed will depend on the application. A bi-stable member 28 is disposed over the hole 26. Member 28 is of a planar, resiliently flexible material. In tested embodiments, vacuum-formable and sheet plastics were used; however, in large, heavy duty industrial applications, if any, metal, such as stainless steel or aluminum, could be employed. As illustrated in FIGS. 3 and 4, respectively, the member 28 is stable in an extended position and in a retracted position. It is free to move between a first stable position arched over the hole 26 as shown in FIG. 3 and a second stable position depressed into the hole as shown in FIG. 4. The outer surface 30 of the member 28 has one portion 32 of touch fastener material attached adjacent the center portion thereof. In its retracted position of FIG. 4, the one portion 32 of the touch fastener material is slightly below the facing surface 22 to be joined. The mating portion 34 of touch fastener material is attached to the facing surface 24 at the intended point of joining. Both portions 32, 34 can be conventional touch fastener materials attached by adhesive, or the like, in any usual manner. It is preferred that the hook portion of hook and loop type materials comprise the one portion 32 attached to the member 28 since there appears to be some additional gripping force created by the inward flexing of the hooks when moving to the retracted position; however the materials could be reversed, if desired, without significant adverse effect. In use, the two portions 32, 34 are positioned opposite one another, thus forcing the portions 32, 34 into engagement while simultaneously pushing on the bi-stable member 28, which ultimately causes member 28 to go over center and flip towards its second bi-stable state of FIG. 4 with the facing surfaces 22, 24 held flush together by the biasing force of the member 28 trying to pull into the hole 26 and assume its full second bi-stable position.

Turning now to FIGS. 5–8, the present invention is shown in one tested embodiment as contemplated for possible commercial production. As should be appreciated from the description above, the present invention comprises two functional portions—a piece of resiliently flexible material having the one portion of touch fastener material attached to a surface thereof adjacent a center portion thereof and means for holding the bi-stable material in a foreshortened bi-stable state disposed over a hole in one of the surfaces and for allowing the material to move between its first and second stable positions. The embodiment of FIGS. 5–8 combines these two functions into one unitary piece of vacuum-formed plastic. The fastener component of the present invention, generally indicated as 36, is circular in shape and comprises an annular outer holding portion 38 and a dome-shaped central portion 40 which acts as the bi-stable member. As best seen in the cutaway views of FIGS. 6 and 7, the holding portion has an outer mounting lip 42 which is parallel to the surface to be joined. The lip 42 can be fastened to the bottom surface 44 of a hole 26 as shown in FIG. 8 with adhesive, staples, or any other conventional means. An angled, annular support portion 46 extends between the lip 42 and an inner annular pivot rib 48 to which the dome-shaped central portion 40 is attached and about which it pivots when "oilcanning" between its two stable positions. The support portion 46 adds stiffness to the structure and raises the domed portion 40 above the bottom 44 sufficiently to allow movement between the two stable positions as shown in FIGS. 6 and 7. This embodiment in use is shown in FIG. 8. As can be seen therein, if desired, the mating portion 34 of the touch fastener material can be mounted on a curved or domed backing piece 50 to provide closer conformity and, therefore, more intimate contact of the interacting touch fastener materials in the mounted position.

Figure 10:
FIG. 10 is a side view of the present invention as shown in FIG. 9.
Figure 11:
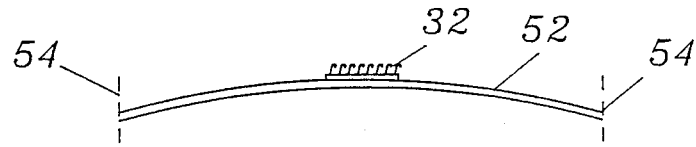
FIGS. 11 and 12 are side views of the present invention as shown in FIGS. 9 and 10 illustrating how foreshortening the strip results in the required bi-stable condition thereof.
Figure 12:
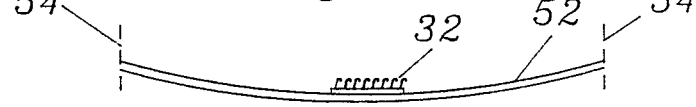
Figure 13:
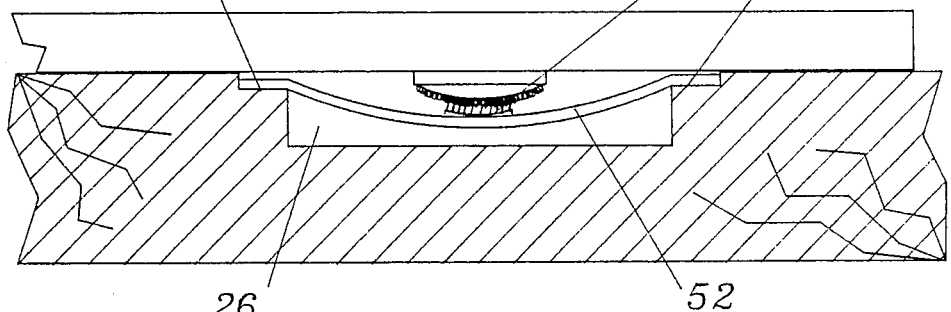
FIG. 13 shows the use of the embodiment of the present invention of FIGS. 9–12 in the manner of FIG. 8.
Figure 14:
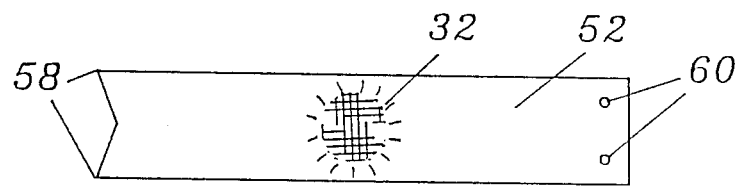
FIGS. 14 and 15 show various ways holding means can be incorporated into a variation of the strip embodiment of FIGS. 9–12.
Figure 15:
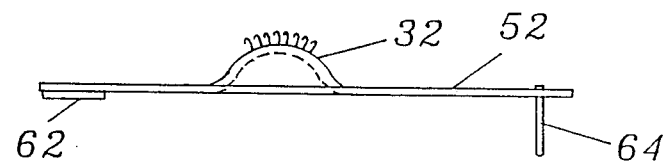

Turning now to FIGS. 9–15, the present invention is shown in its simplest embodiment. As shown in FIGS. 9 and 10, this embodiment comprises a rectangular strip 52 of the resiliently flexible back material having the one portion 32 of the touch fastener material formed therewith or attached thereto at the center thereof. As will be appreciated by those skilled in the art, if the strip 52 is held in a foreshortened position as indicated by the dotted lines 54 in FIGS. 11 and 12, it will become bi-stable, as required for operation. This can be accomplished in the manner shown in FIG. 13, for example, by the providing of foreshortened mounting ridges 56 as part of the hole 26. Alternate means for holding the strip 52 in its foreshortened position are shown in FIGS. 14–15 which illustrate an embodiment having touch fastener elements 32 on a bi-stable dome formed in a strip 52. For example, points 58 could be formed into the ends of the strip 52 for engaging the sidewalls of the hole 26. Holes 60 could be provided therein adjacent the ends for the use of nails, screws, or the like to fasten the strip 52 to the surface surrounding the hole 26 in a foreshortened state. Adhesive strips 62 could be used for like purpose, as could be staples 64 driven through the plastic of the strip 52. A contiguous plurality of strips 52 may be formed as a continuous strip (see e.g. FIGS. 9 and 10) to be separated into individual strips 52 prior to use.

Figure 16:
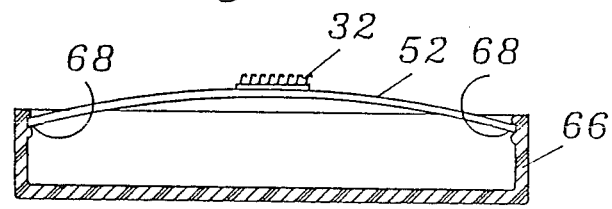
FIG. 16 is a cutaway side view of a cup-shaped holding means for use in conjunction with the strip embodiment of FIGS. 9–12.
Figure 17:
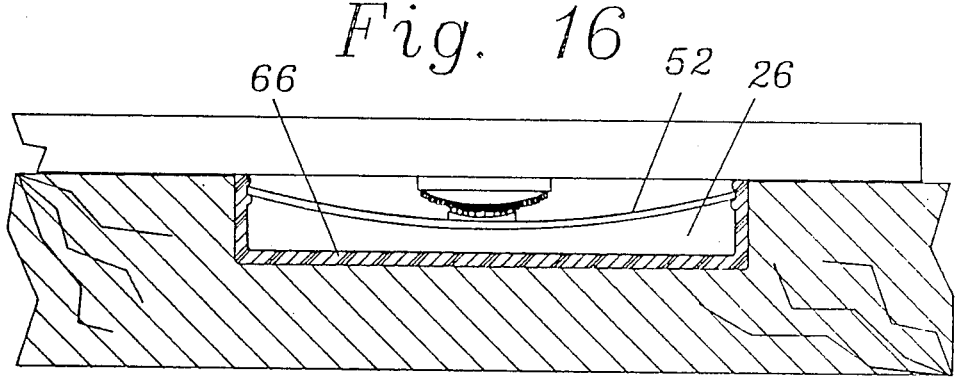
FIG. 17 shows the embodiment of the present invention of FIG. 16 in use in the manner of FIG. 8.

FIGS. 16 and 17 show another possibility for holding means to be used with the basic rectangular strip embodiment of FIGS. 9 and 10. In this instance, the holding means comprises a cup-shaped member 66 of plastic or metal adapted to be mounted within the hole 26. Member 66 has opposed recesses 68 adjacent the top edge for receiving the ends of the strip 52. This embodiment is shown in use in FIG. 17.

Bi-stable members carrying one part of a touch fastener could be formed as part of continuous molded material, e.g. each member may comprise, in part, a dome (similar to the dome of FIGS. 14 and 15) molded into a strip of touch fastener material.

In a preferred arrangement the separating force of the touch fastener is greater than the force needed to move the bi-stable member from its second stable position to its first stable position. It will be appreciated that the inward turning of the fastener component upon operation causes the fastener to operate, at least in part, in shear with the consequence of an increase in attachment strength.

Thus it can be seen that in various embodiments as described hereinbefore, the present invention has achieved its desired object by providing a means for employing touch fastener material to achieve a true flush mounting of two surfaces together.

Wherefore, having thus described my invention, I claim:

1. A touch fastener system attached to a first structure, for fastening said first structure to a second structure, said touch fastener system comprising a first part, attached to said first structure, carrying a plurality of projecting elements of a shape comprising one of hooks, loops, mushrooms, balls on stems, and pigtails, said elements capable of engaging cooperating elements of a shape comprising one of hooks, loops, mushrooms, balls on stems, and pigtails, said cooperating elements carried by a second part of the touch fastener system capable of attachment to said second structure, for fastening the two structures together, comprising:
    (a) a resilient member having said first part of the touch fastener system attached to a surface thereof at least adjacent a center portion thereof; and
    (b) restraining means, comprising an opening in said first structure, defining a curvature of said resilient member to form a bi-stable spring able to be moved from a first of two stable positions to a second of the two stable positions, whereby in said first stable position the elements of said first part are capable of engagement with the cooperating elements of said second part, so that when pressure sufficient to move said resilient member to its second stable position is applied to press said first and second parts together, said first and second structures are drawn closer together as a result of the movement of said resilient member to its second stable position.

2. A touch fastener system according to claim 1, wherein the resilient member is a dome and said restraining means is a perimeter portion of the dome.

3. A touch fastener system according to claim 1 wherein the resilient member forms a leaf spring and said restraining means defines the chord length of the leaf spring's curvature.

4. A touch fastener system attached to a first surface, for fastening said first surface to a second surface, said touch fastener system comprising a first part, attached to said first surface, carrying a plurality of projecting elements of a shape comprising one of hooks, loops, mushrooms, balls on stems, and pigtails, said elements capable of engaging cooperating elements of a shape comprising one of hooks, loops, mushrooms, balls on stems, and pigtails, said cooperating elements carried by a second part of the touch fastener system capable of attachment to said second surface, for fastening the two surfaces together, comprising:
    (a) a resilient member having said first part of the touch fastener system attached to a surface thereof at least adjacent a center portion thereof; and
    (b) restraining means, comprising an opening in said first surface, defining a curvature of said resilient member to form a bi-stable spring able to be moved from a first of two stable positions to a second of the two stable positions, whereby in said first stable position the elements of said first part are capable of engagement with the cooperating elements of said second part, so that when pressure sufficient to move said resilient member to its second stable position is applied to press said first and second parts together, said first and second surfaces are drawn closer together as a result of the movement of said resilient member to its second stable position.

5. A touch fastener system according to claim 4 wherein the resilient member is a dome and said restraining means is a perimeter portion of the dome.

6. A touch fastener system according to claim 4 wherein the resilient member forms a leaf spring and said restraining means defines the chord length of the leaf spring's curvature.

7. A touch fastener system attached to a first surface, for fastening said first surface to a second surface, said touch fastener system comprising a first part, attached to said first surface, carrying a plurality of projecting elements of a shape comprising one of hooks, loops, mushrooms, balls on stems, and pigtails, said elements capable of engaging cooperating elements of a shape comprising one of hooks, loops, mushrooms, balls on stems, and pigtails, said cooperating elements carried by a second part of the touch fastener system capable of attachment to said second surface, for fastening the two surfaces together, comprising:
    (a) a resilient member having said first part of the touch fastener system attached to a surface thereof at least adjacent a center portion thereof; and
    (b) restraining means, comprising an opening in said first surface, defining a curvature of said resilient member to form a bi-stable spring able to be moved from a first of two stable positions to a second of the two stable positions;
    said resilient member being disposed relative to said first surface with said first part of the touch fastener above said first surface when said member is in said first stable position and with said first part of the touch fastener below said first surface when said member is in said second stable position, whereby in said first stable position the elements of said first part are capable of engagement with the cooperating elements of said second part, so that when pressure sufficient to move said resilient member to its second stable position is applied to press said first and second parts together, said first and second surfaces are drawn closer together as a result of the movement of said resilient member to its second stable position.

8. A touch fastener system according to claim 7 wherein the resilient member is a dome and said restraining means is a perimeter portion of the dome.

9. A touch fastener system according to claim 7 wherein the resilient member forms a leaf spring and said restraining means defines the chord length of the leaf spring's curvature.

10. A touch fastener system according to any one of claims 1, 4 or 7, wherein said resilient member is a strip of material and the opposed ends of the strip are engaged with said opening of said restraining means to define said curvature.

11. A touch fastener system according to any one of claims 1, 4 or 7, wherein said resilient member is a dome mounted to said first structure and extending above said opening of said restraining means when in said first stable position and being received within said opening below that structure when in said second stable position.

12. A touch fastener system as in any of claims 1-7, wherein said opening of said restraining means comprises one of a hole, a recess, or a cup-shaped member.

* * * * *